(12) United States Patent
Inoue et al.

(10) Patent No.: US 8,597,735 B2
(45) Date of Patent: Dec. 3, 2013

(54) ELECTROSTATIC POWDER COATING METHOD AND ELECTROSTATIC POWDER COATING APPARATUS

(75) Inventors: Keiji Inoue, Kosai (JP); Makoto Oishi, Hamamatsu (JP); Yuya Furukawa, Kosai (JP); Yoshihiro Ikebe, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 278 days.

(21) Appl. No.: 13/032,006

(22) Filed: Feb. 22, 2011

(65) Prior Publication Data
US 2011/0229650 A1    Sep. 22, 2011

(30) Foreign Application Priority Data

Mar. 17, 2010  (JP) .................................. 2010-61083
Mar. 17, 2010  (JP) .................................. 2010-61084

(51) Int. Cl.
*B05D 1/06* (2006.01)
*B05D 3/02* (2006.01)

(52) U.S. Cl.
USPC ......... 427/477; 427/475; 427/104; 427/376.1

(58) Field of Classification Search
USPC ............................... 427/475, 477, 104, 376.1
See application file for complete search history.

(56) References Cited

U.S. PATENT DOCUMENTS

| | | | |
|---|---|---|---|
| 5,922,413 A * | 7/1999 | Takeda | 427/470 |
| 6,056,821 A | 5/2000 | Nihongi | |
| 6,264,745 B1 * | 7/2001 | Diaz | 118/326 |
| 7,371,284 B2 | 5/2008 | Nagami | |

FOREIGN PATENT DOCUMENTS

JP    A-6-285397    10/1994

* cited by examiner

*Primary Examiner* — Frederick Parker
(74) *Attorney, Agent, or Firm* — Posz Law Group, PLC

(57) ABSTRACT

Workpieces, which are conveyed by a conveying device along a conveying path, are heated by a heating and degreasing coil. Then, resin powder is downwardly sprayed from a nozzle of a coating device to each corresponding one of the workpieces, which are conveyed by the conveying device. The workpieces are thereafter heated by a heating and curing coil. At each of the heating coils, a dummy member, which is made of an electrically conductive material, is displaced from a retracted position to a forward position, which is located between the corresponding heating coil and a corresponding adjacent part of the conveying path of the conveying device, when an empty one of mount locations of the conveying device reaches the forward position of the dummy member.

12 Claims, 8 Drawing Sheets

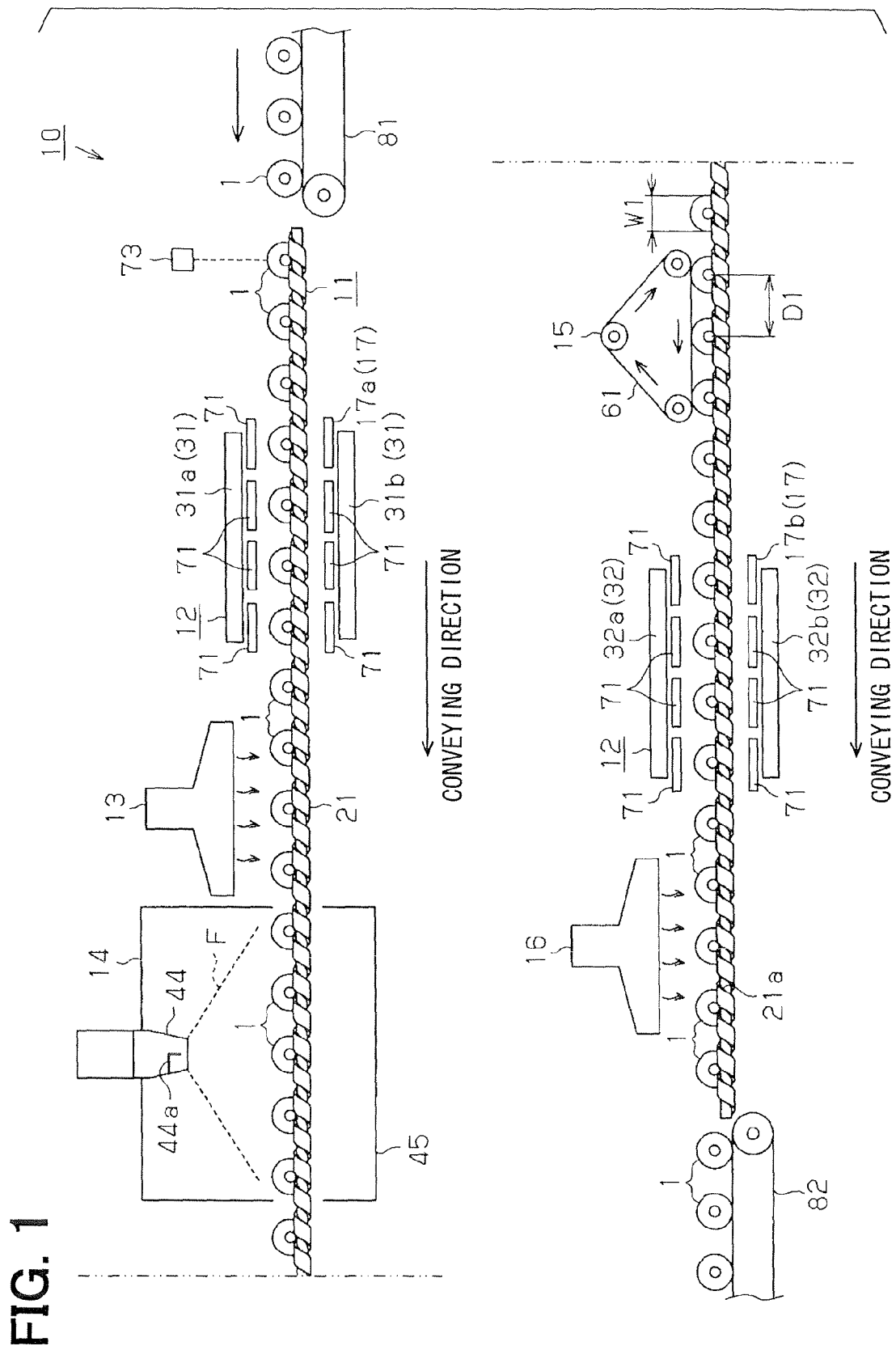

ELECTROSTATIC POWDER COATING METHOD AND ELECTROSTATIC POWDER COATING APPARATUS

CROSS REFERENCE TO RELATED APPLICATION

This application is based on and incorporates herein by reference Japanese Patent Application No. 2010-61083 filed on Mar. 17, 2010 and Japanese Patent Application No. 2010-61084 filed on Mar. 17, 2010.

BACKGROUND OF THE INVENTION

1. Field of the Invention

The present invention relates to an electrostatic powder coating method and an electrostatic powder coating apparatus.

2. Description of Related Art

It is known to coat an armature component of a dynamoelectric machine (e.g., an electric motor) with a dielectric resin material to insulate between the armature component and armature coils wound therearound. The coating of the resin material to the armature component is made with, for example, an electrostatic powder coating apparatus (system) recited in, for instance, Japanese Unexamined Patent Publication No. H06-285397A.

At the time of insulating the armature component, the armature component (also referred to as a workpiece) is conveyed to various processes through a screw conveyer in the electrostatic powder coating apparatus. First of all, the armature component is conveyed to a heating and degreasing process. In the heating and degreasing process, the armature component is heated by a high-frequency induction heating device to heat and degrease the armature component. Next, the armature component is conveyed to a cooling process, at which the armature component is cooled with the air blown thereto. Thereafter, the armature component is conveyed to a coating process, at which dielectric resin powder, such as epoxy resin powder, is applied from a coating device to the armature component. In this way, the surface of the armature component is coated with the resin powder. Next, the armature component is conveyed to a heating and curing process, at which the armature component is heated by a high-frequency swing heating device. In this way, the resin powder, which adheres to the surface of the armature component, is heat cured and is thereby fixed to the surface of the armature component. Finally, the armature component is conveyed to another cooling process, at which the armature component is cooled with the air blown thereto.

FIG. 8A shows a result of an experiment, in which armature components are conveyed continuously one after another at equal intervals by the screw conveyer and are heated by the high-frequency induction heating device. More specifically, FIG. 8A shows a relationship between a temperature difference between a first one and a center one of the armature components in a row of the armature components on the screw conveyer in the high-frequency induction heating device and an interval of the armature components in the row of the armature components. With reference to FIG. 8B, an interval D2 of the armature components 101 is a distance between a central axis (center) of one of two adjacent armature components 101 and a central axis (center) of the other one of the two adjacent armature components 101. The interval D2 is set to be a multiple of a width W3 of the armature component 101 in the conveying direction. With reference to FIG. 8A, it should be noted that the temperature difference between the first one and the center one of the armature components is smaller as the interval D2 between the armature components becomes longer. Therefore, when the interval between the armature components is reduced to reduce the entire size of the electrostatic powder coating apparatus, the variation in the temperature of the armature components conveyed by the screw conveyer becomes large in the heating and degreasing process and the heating and curing process. Thus, a degree (state) of degreasing of the armature component and a degree (state) of curing of the resin powder may possibly vary from product to product, thereby possibly resulting in variations in the quality of the armature components after the powder coating.

Furthermore, in order to reduce the size of the electrostatic powder coating apparatus, it is desirable to supply the alternating current from a single high frequency oscillator to the heating coil used in the heating and degreasing process and also to the heating coil used in the heating and curing process. When the alternating current is simultaneously supplied from the single high-frequency oscillator to the two heating coils, there is substantially no temperature difference between the armature components in the heating and degreasing process and the armature components in the heating and curing process as long as the screw conveyer is fully loaded with the armature components in these two processes. However, in a case where the number of the armature components conveyed by the screw conveyer in the heating and degreasing process is reduced and thereby becomes smaller while the armature components are kept fully loaded on the screw conveyer in the heating and curing process, the temperature of the armature components conveyed by the screw conveyer in the heating and degreasing process become higher than the temperature of the armature components conveyed by the screw conveyer in the heating and curing process. Similarly, in a case where the armature components are kept fully loaded on the screw conveyer in the heating and degreasing process while the number of the armature components conveyed by the screw conveyer in the heating and curing process is reduced and thereby becomes smaller, the temperature of the armature components conveyed by the screw conveyer in the heating and curing process becomes higher than the temperature of the armature components conveyed by the screw conveyer in the heating and degreasing process. Furthermore, in the heating and degreasing process and the heating and curing process, when the number of components on the screw conveyer is reduced in both of the heating and degreasing process and the heating and curing process, the temperature of the armature components is raised in both of the heating and degreasing process and the heating and curing process. When the temperature of the armature component in the heating and degreasing process varies among the armature components, the degree (state) of degreasing of the armature component varies among the armature components. Furthermore, when the temperature of the armature component in the heating and curing process varies among the armature components, the degree (state) of curing of the armature component also varies among the armature components. Therefore, the quality of the armature component may vary among the armature components. Furthermore, when the temperature in the heating and degreasing process and the temperature in the heating and curing process become excessively high, the heat resistance property of the screw conveyer may possibly be deteriorated.

Furthermore, in Japanese Unexamined Patent Publication No. H06-285397A, the electrostatic powder coating apparatus includes an electrode receiver, a storage container and a vacuum box. The electrode receiver receives an electrode. The storage container is placed above the electrode receiver and stores resin powder. The vacuum box is placed above the storage container. The armature component is conveyed into the vacuum box, and the resin powder is upwardly sprayed along the compressed air against the armature component from the lower side of the armature component to coat the resin powder on the surface of the armature component. At this time, a negative voltage is applied to the electrode, so that the resin powder is placed in the negatively charged state. In contrast, the armature component is positively charged. Therefore, the resin powder electrostatically adheres to the surface of the armature component. The resin powder, which did not adhere to the armature component, is drawn out of the vacuum box from an upper part of the vacuum box and is recovered.

Japanese Unexamined Patent Publication No. 2005-138048A (corresponding to U.S. Pat. No. 7,371,284B2) teaches another type of electrostatic powder coating apparatus. In this electrostatic powder coating apparatus, the resin powder, which is positively charged, is downwardly sprayed onto an armature component, which is negatively charged, from the upper side of the armature component, so that the resin powder is coated on the surface of the armature component.

FIG. 10 is a diagram indicating a histogram of a particle size of the new resin powder (virgin material) and a histogram of a particle size of the collected resin powder, which is collected from the storage container after upwardly spraying the resin powder to the armature component 1 from the lower side of the armature component 1 in the electrostatic powder coating apparatus of Japanese Unexamined Patent Publication No. H06-285397A. As is understood from FIG. 10, in the case of the electrostatic powder coating apparatus, which upwardly sprays the resin powder to the armature component from the lower side of the armature component, the small powder particles having small particle sizes tend to be increased in the storage container in comparison to the large powder particles having large particle sizes. This is due to the following reason. That is, since the small powder particles cannot be easily adhered to the surface of the armature component, the small powder particles fell down without adhering to the surface of the armature component. When the quantity of the small powder particles is increased in the storage container, the stable adhesion of the resin powder to the surface of the armature component becomes difficult. Therefore, the film thickness of the dielectric insulation film, which is formed on the surface of the armature component, may vary from product to product. Furthermore, the small powder particles of the resin powder tend to cause an insufficiency of the film thickness of the dielectric insulation film.

Furthermore, it is lately demanded to recycle the resin powder, which was sprayed to the armature component and did not adhere to the armature component, for the next spraying of the resin powder. In the electrostatic powder coating apparatus of Japanese Unexamined Patent Publication No. 2005-138048A (corresponding to U.S. Pat. No. 7,371,284B2), the resin powder is downwardly sprayed onto the armature component from the upper side of the armature component. However, it does not teach a specific way of recycling the resin powder.

SUMMARY OF THE INVENTION

The present invention is made in view of the above disadvantages. Thus, it is an objective of the present invention to provide an electrostatic powder coating method and an electrostatic powder coating apparatus, which enable reduction or minimization of a temperature difference among workpieces while allowing a size reduction of the electrostatic powder coating apparatus. It is another objective of the present invention to provide an electrostatic powder coating method and an electrostatic powder coating apparatus, which can limit variations in a film thickness of a coated film formed by coating resin powder on a surface of an armature component even when the resin powder is recycled.

According to the present invention, there is provided an electrostatic powder coating method. In the method, resin powder is applied from a coating device to a surface of each of a plurality of workpieces, which are conveyed by a conveying device in a conveying direction along a conveying path, upon electrically charging the resin powder with an opposite polarity, which is opposite to a polarity of each of the plurality of workpieces. Each corresponding one or more of the plurality of workpieces is heated by high-frequency induction heating with at least one heating coil, each of which is placed on a corresponding one of an upstream side and a downstream side of the coating device in the conveying direction along the conveying path, upon supplying of a high-frequency alternating current to the at least one heating coil. Each of at least one overheat limiting device is associated with a corresponding one of the at least one heating coil to limit overheating of each corresponding one or more of the plurality of workpieces at time of supplying the high-frequency alternating current to the corresponding one of the at least one heating coil. In driving of the at least one overheat limiting device, a dummy member, which is made of an electrically conductive material, of the at least one overheat limiting device is displaced from a retracted position to a forward position, which is located between the corresponding one of the at least one heating coil and a corresponding adjacent part of the conveying path of the conveying device, when an empty one of a plurality of mount locations of the conveying device, which are placed one after another in the conveying direction along the conveying path and are adapted to convey the plurality of workpieces, respectively, reaches the forward position of the dummy member.

According to the present invention, there is also provided another electrostatic powder coating method. In the method, resin powder, which is supplied from a storage container, is downwardly sprayed through a spray device to each corresponding one of a plurality of workpieces, which are conveyed by a conveying device in a conveying direction along a conveying path, from a location above the workpiece. Remaining resin powder, which falls down without adhering to the workpiece upon the downwardly spraying of the resin powder from the spray device, is recovered through a recovery device. In the recovering of the remaining resin powder, the remaining resin powder is recovered from a location below the workpiece, and the recovered remaining resin powder is separated into recyclable resin powder to be recycled and waste resin powder to be wasted. The waste resin powder is collected from the recovery device through a disposal device, and the waste resin powder is disposed through the disposal device. The recyclable resin powder is conducted from the recovery device to the storage container through a recycle conduit.

According to the present invention, there is also provided an electrostatic powder coating apparatus, which includes a conveying device, a coating device, at least one heating coil, and at least one overheat limiting device. The conveying device is adapted to convey a plurality of workpieces, which are fed one after another onto the conveying device, in a conveying direction along a conveying path. The coating device is adapted to apply resin powder to a surface of each of the plurality of workpieces conveyed by the conveying device along the conveying path upon electrically charging the resin powder with an opposite polarity, which is opposite to a polarity of each of the plurality of workpieces. Each of the at least one heating coil is placed on a corresponding one of an upstream side and a downstream side of the coating device in the conveying direction along the conveying path and is adapted to heat each corresponding one or more of the plurality of workpieces by high-frequency induction heating upon supplying of a high-frequency alternating current to the heating coil. Each of the at least one overheat limiting device is associated with a corresponding one of the at least one heating coil to limit overheating of each corresponding one or more of the plurality of workpieces and includes a dummy member, which is made of an electrically conductive material. The dummy member is adapted to be displaced from a retracted position to a forward position, which is located between the corresponding one of the at least one heating coil and a corresponding adjacent part of the conveying path of the conveying device, when an empty one of a plurality of mount locations of the conveying device, which are placed one after another in the conveying direction along the conveying path and are adapted to convey the plurality of workpieces, respectively, reaches the forward position of the dummy member at time of supplying the high-frequency alternating current to the corresponding one of the at least one heating coil.

According to the present invention, there is also provided an electrostatic powder coating apparatus, which includes a conveying device, a storage container, a spray device, a recovery device, a disposal device and a recycle conduit. The conveying device is adapted to convey a plurality of workpieces, which are fed one after another onto the conveying device, in a conveying direction along a conveying path. The storage container is adapted to store resin powder. The spray device is placed along the conveying path and is adapted to downwardly spray the resin powder, which is supplied from the storage container, to each corresponding one of the plurality of workpieces from a location above the workpiece. The recovery device is adapted to recover remaining resin powder, which falls down without adhering to the workpiece upon spraying of the resin powder from the spray device. The recovery device recovers the remaining resin powder from a location below the workpiece and separates the recovered remaining resin powder into recyclable resin powder to be recycled and waste resin powder to be wasted. The disposal device is adapted to collect the waste resin powder from the recovery device and to dispose the waste resin powder. The recycle conduit is adapted to conduct the recyclable resin powder from the recovery device to the storage container.

BRIEF DESCRIPTION OF THE DRAWINGS

The invention, together with additional objectives, features and advantages thereof, will be best understood from the following description, the appended claims and the accompanying drawings in which:

FIG. 1 is a schematic diagram showing an electrostatic powder coating apparatus according to an embodiment of the present invention;

DETAILED DESCRIPTION OF THE INVENTION

An embodiment of the present invention will be described with reference to the accompanying drawings.

Figure 2A:
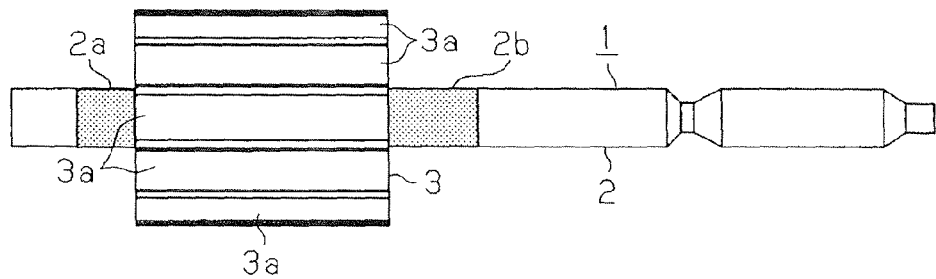
FIG. 2A is a front view of an armature component according to the embodiment.
Figure 2B:
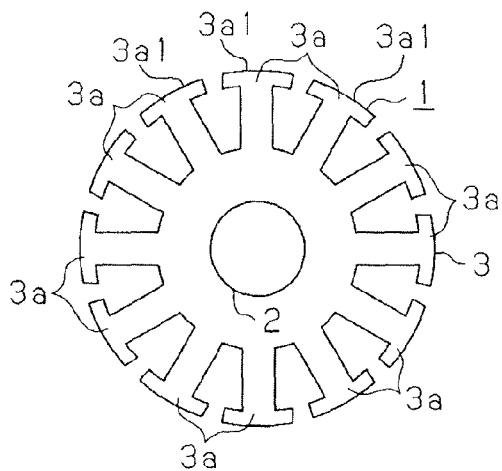
FIG. 2B is an end view of the armature component shown in FIG. 2A.

An electrostatic powder coating apparatus (also referred to as an electrostatic powder coating system) 10 shown in FIG. 1 is used in a powder coating process of armature components 1 in a factory. As shown in FIGS. 2A and 2B, the armature component 1 is a component of an armature (rotor), which is installed in a dynamo-electric machine (e.g., an electric motor, an electric generator). The armature component 1 includes a rotatable shaft (iron shaft) 2 and an armature core (iron core) 3. The rotatable shaft 2 is configured into a cylindrical rod form, and the armature core 3 is fixed to the rotatable shaft 2. The armature core 3 includes a plurality (twelve in this instance) of teeth 3a, which radially outwardly project in a radial direction of the rotatable shaft 2 and are placed one after another at generally equal intervals in a circumferential direction. The teeth 3a are adapted to be wound with armature coils (not shown). Surfaces of the armature component 1 are coated with epoxy resin, which has a dielectric property, in an insulating process to form a dielectric insulation film. The insulated surfaces of the armature component 1, which are insulated with the epoxy resin in the insulating process, include surfaces of the armature core 3 except an outer peripheral surface 3a1 of a radially outer end portion of each tooth 3a. Also, the insulated surfaces of the armature component 1 include outer peripheral surfaces of two axial sections 2a, 2b of the rotatable shaft 2 (i.e., the shaded sections 2a, 2b in FIG. 2A), which are located on two opposed axial sides, respectively, of the armature core 3.

As shown in FIG. 1, the electrostatic powder coating apparatus 10 includes a conveying device 11, a high-frequency heating device 12, a first blower device 13, a coating device (powder applicator device) 14, a removing device 15, a second blower device 16 and an overheat limiting unit 17.

Figure 3:
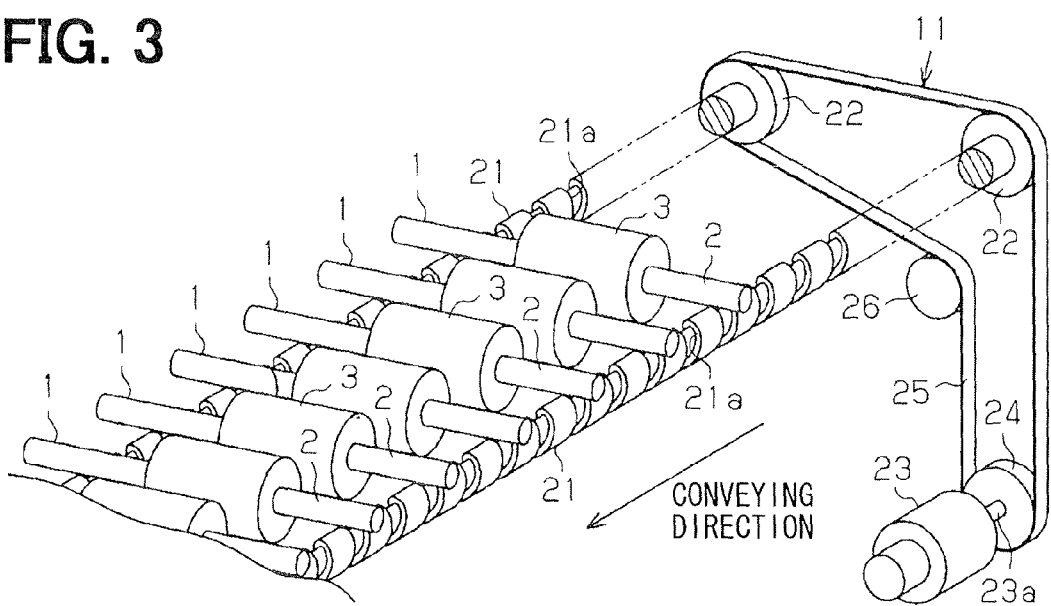
FIG. 3 is a schematic perspective view of a conveying device according to the embodiment.

The conveying device 11 of the present invention is a screw conveyer. With reference to FIG. 3, two screw shafts 21 of the conveying device 11 are made of a resin material and are arranged parallel to each other in such a manner that central axes of these screw shafts 21 are parallel to each other. Thereby, the screw shafts 21 cooperate together to define a planar conveying path, along which the armature components 1 are conveyed by the screw shafts 21. A guide groove 21a, which is configured into a spiral form, is formed in an outer peripheral surface of each screw shaft 21, and a transmission pulley 22 is fixed to a base end (the right end in FIG. 3) of each of the screw shafts 21. A drive motor 23 is placed on the lower side of the screw shafts 21, and a drive pulley 24 is fixed to a distal end part of a rotatable shaft 23a of the drive motor 23. An endless drive belt 25 is wound around the transmission pulleys 22 and the drive pulley 24. A tension of the drive belt 25 is adjusted by adjusting a position of a tension pulley 26, which contacts the drive belt 25. A rotational drive force of the drive motor 23 is conducted to the screw shafts 21 through the drive belt 25, so that the screw shafts 21 are synchronously rotated together in a common direction.

As shown in FIGS. 1 and 3, the armature components 1 are sequentially supplied to, i.e., are sequentially fed from a feed belt conveyer 81 to the conveying device 11 at an upstream end part (supply spot located at the right end part in FIGS. 1 and 3) of the screw shafts 21. Each supplied armature component 1 is placed on the conveying device 11 such that the armature core 3 is located between the screw shafts 21, and the axially opposed sections of the rotatable shaft 2, which axially outwardly project from the armature core 3, are received in the guide grooves 21a, respectively, of the screw shafts 21. When the supplied armature component 1 is seen from a top side in FIG. 3, the axis of the rotatable shaft 2 is generally perpendicular to the axes of the screw shafts 21. When the screw shafts 21 are rotated, each corresponding armature component 1 is rolled about the rotational axis of the rotatable shaft 2 thereof and is thereby conveyed from the proximal end side to a distal end side of the screw shafts 21 (from the right side to the left side in FIG. 1). In a fully loaded state of the screw shafts 21 where the screw shafts 21 are fully loaded with the armature components 1 by continuously and sequentially supplying the armature components 1 to the screw shafts 21 at predetermined intervals, an interval D1 between each adjacent two of the armature components 1 is set to be larger than a width W1 of the armature component 1 (i.e., a diameter of the armature component 1) but is smaller than a product of the width W1 of the armature component 1 multiplied by 2.

Figure 4:
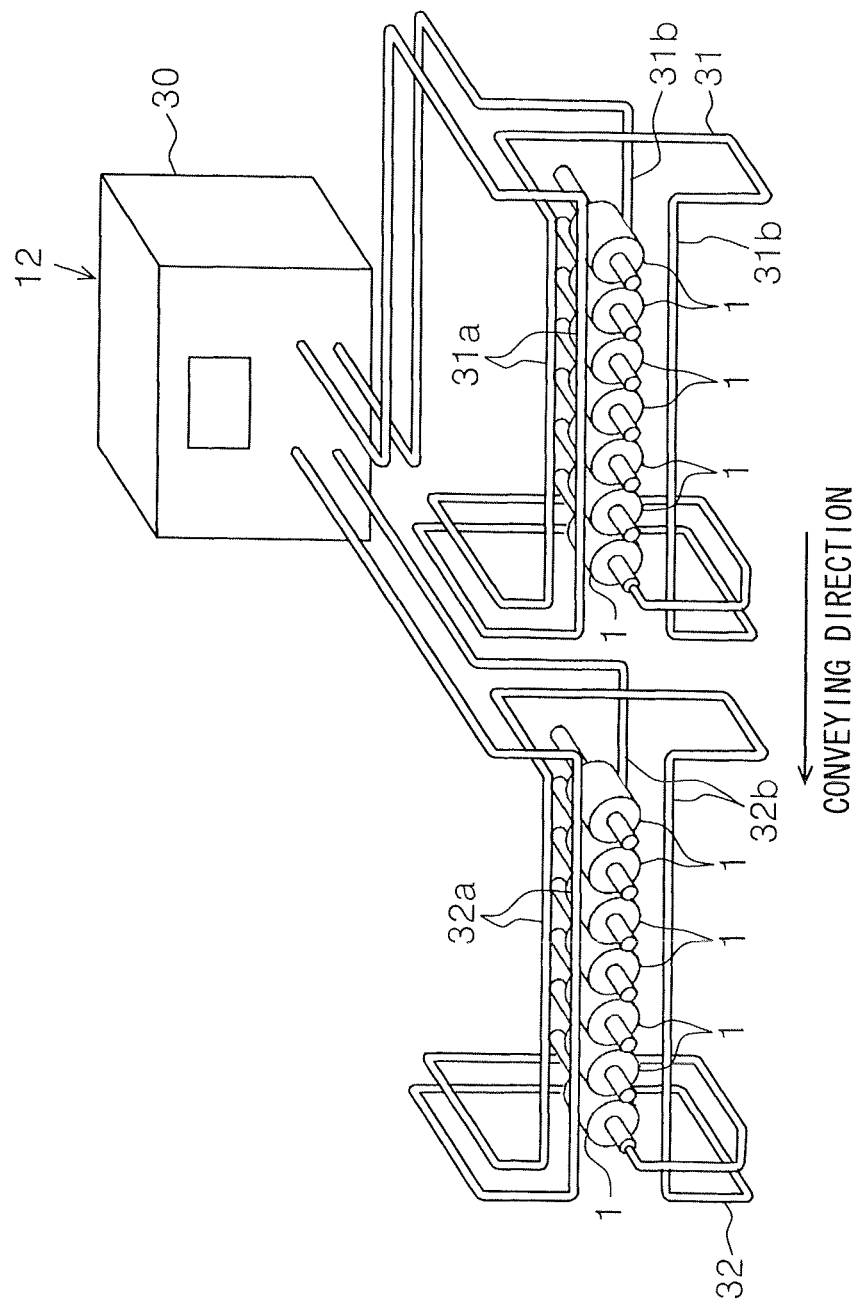
FIG. 4 is a schematic diagram showing a high-frequency heating device according to the embodiment.

As shown in FIGS. 1 and 4, the high-frequency heating device 12 includes a single high-frequency oscillator (high-frequency alternating current source) 30, a heating and degreasing coil 31 and a heating and curing coil 32. In FIG. 4, the screw shafts 21 are not depicted for the sake of simplicity. The heating and degreasing coil 31 is a single hollow metal pipe, which is made of copper and conducts cooling fluid in the interior of the hollow metal pipe. This metal pipe is bent into the shape shown in FIG. 4 to form the coil (work coil) 31. Two ends of the heating and degreasing coil 31 are connected to a positive terminal and a negative terminal, respectively, of the high-frequency oscillator 30 to conduct the high-frequency alternating current supplied from the high-frequency oscillator 30. The heating and degreasing coil 31 includes a first upper heating section 31a and a first lower heating section 31b. The first upper heating section 31a is placed on the upper side of the screw shafts 21, and the first lower heating section 31b is placed on the lower side of the first upper heating section 31a and also on the lower side of the screw shafts 21. The heating and curing coil 32, which is located on the downstream side of the heating and degreasing coil 31 in an conveying direction of the armature components 1 (a flow direction of the armature components 1 along the conveying path), is configured in a manner similar to that of the heating and degreasing coil 31. Specifically, the heating and curing coil 32 includes a second upper heating section 32a and a second lower heating section 32b. The second upper heating section 32a is placed on the upper side of the screw shafts 21, and the second lower heating section 32b is placed on the lower side of the second upper heating section 32a and also on the lower side of the screw shafts 21. A length of the first upper heating section 31a, a length of the first lower heating section 31b, a length of the second upper heating section 32a and a length of the second lower heating section 32b are generally the same in the conveying direction of the armature components 1 on the conveying device 11. The heating and degreasing coil 31 and the heating and curing coil 32 are both electrically connected to the high-frequency oscillator 30 of the high-frequency heating device 12, as discussed above. When the high-frequency alternating current is supplied from the high-frequency oscillator 30 to the heating and degreasing coil 31 and the heating and curing coil 32, the armature components 1, which pass the heating and degreasing coil 31 (more specifically, the space between the first upper heating section 31a and the first lower heating section 31b) and the heating and curing coil 32 (more specifically, the space between the second upper heating section 32a and the second lower heating section 32b), are heated by the high-frequency induction heating.

As shown in FIG. 1, the first blower device 13 is placed between the heating and degreasing coil 31 and the heating and curing coil 32 along the conveying path at a location, which is adjacent to the heating and degreasing coil 31 on the downstream side of the heating and degreasing coil 31 in the conveying direction of the armature components 1. The first blower device 13 blows the air toward the armature components 1, which are conveyed on the conveying device 11.

The coating device 14 is placed between the first blower device 13 and the heating and curing coil 32 along the conveying path at a location, which is adjacent to the first blower device 13 on the downstream side of the first blower device 13 in the conveying direction of the armature components 1.

Figure 5:
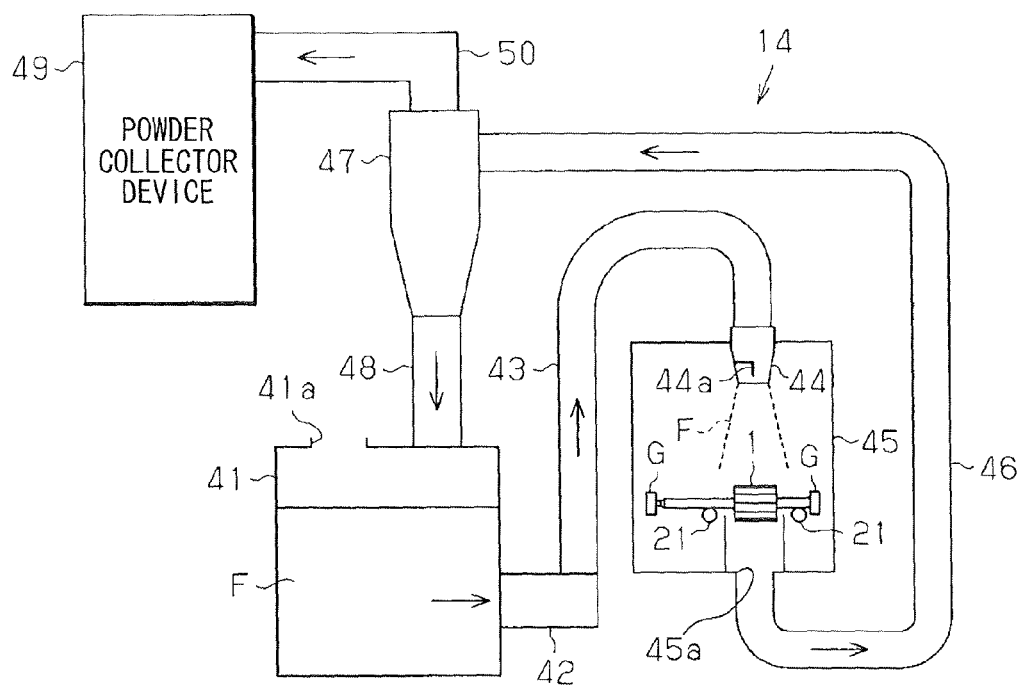
FIG. 5 is a schematic diagram showing a coating device according to the embodiment.

As shown in FIG. 5, a supply tank (storage container) 41, which is configured into a box shape, stores resin powder F, which is epoxy resin powder in this instance. A supply inlet 41a is formed in a ceiling portion of the supply tank 41 to supply the resin powder F into an interior of the supply tank 41 through the supply inlet 41a. A supply screw 42 is installed to a side wall of the supply tank 41 to guide the resin power F, which is stored in the interior of the supply tank 41, to the outside of the supply tank 41. A first conduit (first passage) 43, which is configured into a pipe form, extends from the supply screw 42. A powder nozzle (spray device) 44 is installed to a downstream end part of the first conduit 43 in the flow direction of the resin powder. The powder nozzle 44 is fixed to a ceiling portion of a coating cover (coating housing) 45, which is configured into a box shape. An electrode 44a is placed in an interior of the powder nozzle 44 to electrically charge the resin powder F with an opposite polarity, which is opposite to a polarity of the armature component 1. The powder nozzle 44 is configured to downwardly inject, i.e., spray the resin powder F, which is supplied from the supply tank 41 through the first conduit 43, onto the conveyed armature component 1 placed below the powder nozzle 44 in the vertical direction. The powder nozzle 44 is formed into an appropriate size, which is appropriate to spray the resin powder F to the coating area (coating range) of the conveyed armature component 1. Also, the powder nozzle 44 is exchangeable with another type of powder nozzle depending on the size and the location of the coating area of the conveyed armature component 1.

As shown in FIG. 1, the coating cover 45 is placed to cover a section of the screw shafts 21, which is located between the first blower device 13 and the removing device 15. Furthermore, as shown in FIG. 5, a recovery hole 45a is formed at a corresponding part of a bottom portion of the coating cover 45, which is located below the conveyed armature component 1 in the vertical direction. The recovery hole 45a communicates between the inside and the outside of the coating cover 45. A second conduit (second passage) 46, which is configured into a pipe form, extends from the recovery hole 45a to the outside of the coating cover 45, and a downstream end part of the second conduit 46 is connected to a recovery device 47. An inlet (upstream end) of the second conduit 46 at the coating cover 45 is opened toward the conveyed armature component 1 at a location below the armature component 1 in the vertical direction in the coating cover 45. The coating cover 45 and the recovery device 47 are communicated with each other through the second conduit 46.

The recovery device 47 is formed as a cyclone (also referred to as a cyclone collector or cyclone separator). The recovery device 47 separates the recovered powder particles of the resin powder F, which did not adhere to the armature component 1 upon being downwardly sprayed from the powder nozzle 44 and is thereby brought to the recovery device 47. This separation is made based on the particle size of the recovered powder particles through use of the centrifugation. Specifically, the recovery device 47 separates the recovered powder particles of the resin powder F into small powder particles, which have the particle sizes smaller than a predetermined size (e.g., smaller than 40 μm), and large powder particles, which have the particle sizes equal to or larger than the predetermined size (e.g., equal to or larger than 40 μm). The small powder particles are waste powder particles, which will be disposed, i.e., abandoned as waste resin powder. The large powder particles are recyclable powder particles, which will be recycled as recyclable resin powder.

A lower end part of the recovery device 47 is connected to a third conduit (a third passage also referred to as a recycle passage) 48, which serves as a recycle conduit and communicates between the recovery device 47 and the supply tank 41. The recyclable resin powder, which is separated at the recovery device 47, is guided to the supply tank 41 through the third conduit 48. An upper end part of the recovery device 47 is connected to a fourth conduit (fourth passage) 50, which is configured into a pipe form. The fourth conduit 50 communicates between the recovery device 47 and a powder collector device (disposal device) 49. The waste resin powder, which is separated at the recovery device 47, is guided to the powder collector device 49 through the fourth conduit 50 and is wasted, i.e., is disposed.

As shown in FIG. 1, the removing device 15 is placed between the coating device 14 and the heating and curing coil 32 along the conveying path at a location, which is adjacent to the coating device 14 on the downstream side of the coating device 14 in the conveying direction of the armature components 1. The removing device 15 includes a cleaning belt 61, which is placed on the upper side of the screw shafts 21. The cleaning belt 61 is rotated such that the cleaning belt 61 contacts the armature core 3 of the armature component 1, which is conveyed along the screw shafts 21 on the lower side of the cleaning belt 61, so that the resin powder F, which adheres to the outer peripheral surface of the armature core 3 (specifically, the outer peripheral surface 3a1 of the radially outer end part of each of the teeth 3a), is removed by the cleaning belt 61.

The second blower device 16 is placed along the conveying path at a location, which is adjacent to the heating and curing coil 32 on the downstream side of the heating and curing coil 32 in the conveying direction of the armature components 1. Similar to the first blower device 13, the second blower device 16 blows the air toward the armature components 1, which are conveyed along the conveying path by the conveying device 11.

Figure 6A:
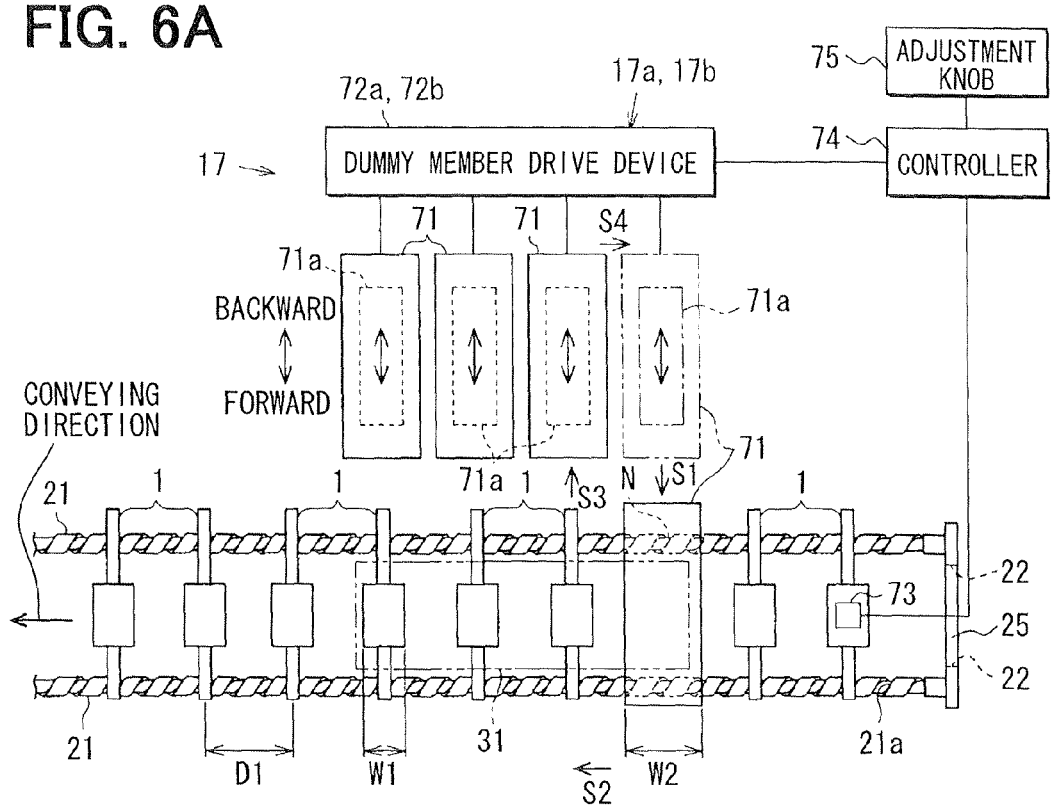
FIG. 6A is a plan view of an overheat limiting unit according to the embodiment.
Figure 6B:
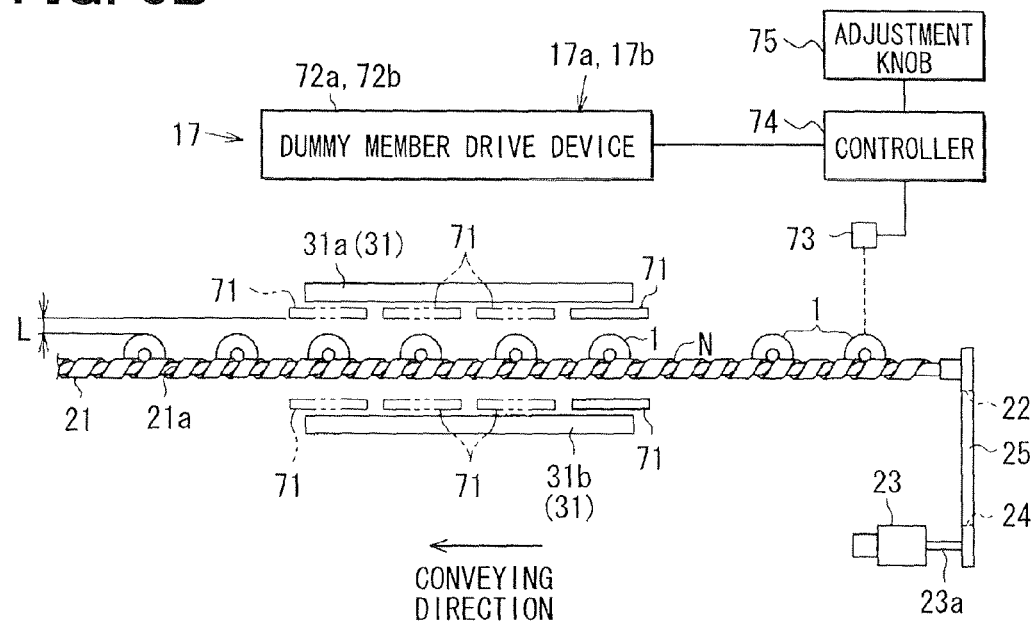
FIG. 6B is a side view of the overheat liming unit shown in FIG. 6A.

As shown in FIGS. 6A and 6B, the overheat limiting unit 17 includes a plurality of dummy members 71, first and second dummy member drive devices 72a, 72b, a photosensor 73 (sensing means) and a controller 74 (recognizing means and control means).

Each of the dummy members 71 is made of copper, which is electrically conductive, and is configured into a rectangular plate body. Alternatively, each dummy member 71 may be made of a copper alloy. A size of each dummy member 71 is set to correspond with a size of the armature component 1. For instance, in the present embodiment, a width W2 of each dummy member 71 measured in the conveying direction is set to be slightly larger than a width W1 (which is the same as a diameter of the armature core 3) of the armature component 1 measured in the conveying direction. Furthermore, a length of the dummy member 71, which is measured in a direction parallel to the axial direction of the armature component 1, is set to be generally the same as an axial length of the armature component 1. Furthermore, a cooling circuit 71a is provided in the dummy member 71. The cooling circuit 71a circulates cooling fluid (coolant fluid in liquid state), which is circulated from an external cooling fluid circulation device (not shown), to cool the dummy member 71.

The dummy members 71 are arranged one after another in the conveying direction of the armature components 1 (in the axial direction of the screw shaft 21) on the lateral side of the heating and degreasing coil 31 and on the lateral side of the heating and curing coil 32 such that the width direction of the dummy member 71 coincides with the conveying direction of the armature components 1. Specifically, as shown in FIG. 1, one-fourth of the total number of the dummy members 71 is arranged on the lateral side of the heating and degreasing coil 31 such that the dummy members 71 are insertable into an upper side space, which is vertically defined between the first upper heating section 31a and the screw shafts 21. Furthermore, another one-fourth of the total number of the dummy members 71 is arranged on the lateral side of the heating and degreasing coil 31 such that the dummy members 71 are insertable into a lower side space, which is vertically defined between the first lower heating section 31b and the screw shafts 21. Another one-fourth of the total number of the dummy members 71 is arranged on the lateral side of the heating and curing coil 32 such that the dummy members 71 are insertable into an upper side space, which is vertically defined between the second upper heating section 32a and the screw shafts 21. A remaining one-fourth of the total number of the dummy members 71 is arranged on the lateral side of the heating and curing coil 32 such that the dummy members 71 are insertable into a lower side space, which is vertically defined between the second lower heating section 32b and the screw shafts 21.

Each armature component 1 is conveyed by the screw shafts 21 on the lower side of the dummy members 71, which are placed in the upper side space vertically defined between the first upper heating section 31a and the screw shafts 21. Also, at this time, the armature component 1 is conveyed by the screw shafts 21 on the upper side of the dummy members 71, which are placed in the lower side space vertically defined between the first lower heating section 31b and the screw shafts 21. Furthermore, each armature component 1 is conveyed by the screw shafts 21 on the lower side of the dummy members 71, which are placed in the upper side space vertically defined between the second upper heating section 32a and the screw shafts 21. Also, at this time, the armature component 1 is conveyed by the screw shafts 21 on the upper side of the dummy members 71, which are placed in the lower side space vertically defined between the second lower heating section 32*b* and the screw shafts 21.

The first dummy member drive device 72*a* is associated with the heating and degreasing coil 31 to drive the dummy members (one half of the total number of the dummy members) 71 associated with the heating and degreasing coil 31, and the second dummy member drive device 72*b* is associated with the heating and curing coil 32 to drive the dummy members (one half of the total number of the dummy members) 71 associated with the heating and curing coil 32. As shown in FIG. 6A, each of the first and second dummy member drive devices 72*a*, 72*b* drives each corresponding one of the dummy members 71 forward or backward between a forward position (see the right end dummy member 71 indicated with the solid line) and a retrieved position (see the right end dummy member 71 indicated with the dot-dot-dash line) thereof in a direction, which is generally perpendicular to the conveying direction of the armature components 1 and is generally parallel to an imaginary plane, in which the central axis of each of the screw shafts 21 resides, i.e., in which the corresponding adjacent part of the planar conveying path resides. The first dummy member drive device 72*a* and the dummy members 71 associated with the heating and degreasing coil 31 form a first overheat limiting device 17*a* of the overheat limiting unit 17. Also, the second dummy member drive device 72*b* and the dummy members 71 associated with the heating and curing coil 32 form a second overheat limiting device 17*b* of the overheat limiting unit 17.

Furthermore, the photosensor 73 is a known type of photosensor. As shown in FIG. 6B, the photosensor 73 is placed above the upstream end part (supply part) of the screw shafts 21 in the vertical direction to sense whether the armature component 1 is present on the screw shafts 21 at the upstream end part of the screw shafts 21. The photosensor 73 outputs a sensed result to the controller 74.

The first and second dummy member drive devices 72*a*, 72*b* and the photosensor 73 are electrically connected to the controller 74. The controller 74 controls the operation of each dummy member drive device 72*a*, 72*b* based on the sensed result received from the photosensor 73.

Figure 7:
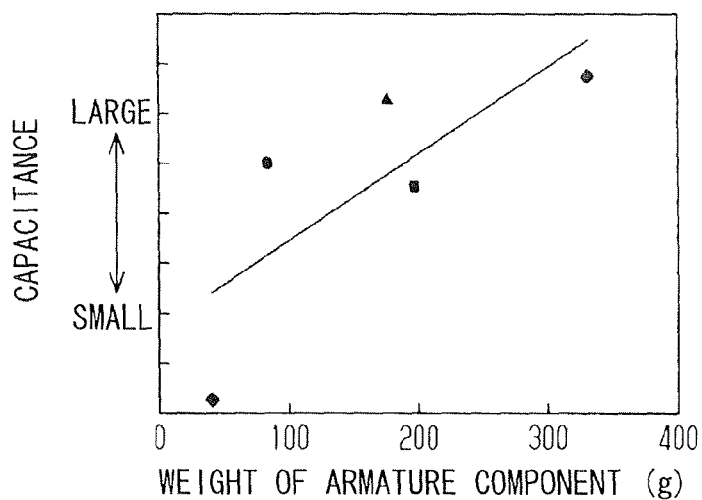
FIG. 7 is a diagram showing a relationship between a weight of the armature component and a capacitance of a variable capacitor according to the embodiment.
Figure 8A:
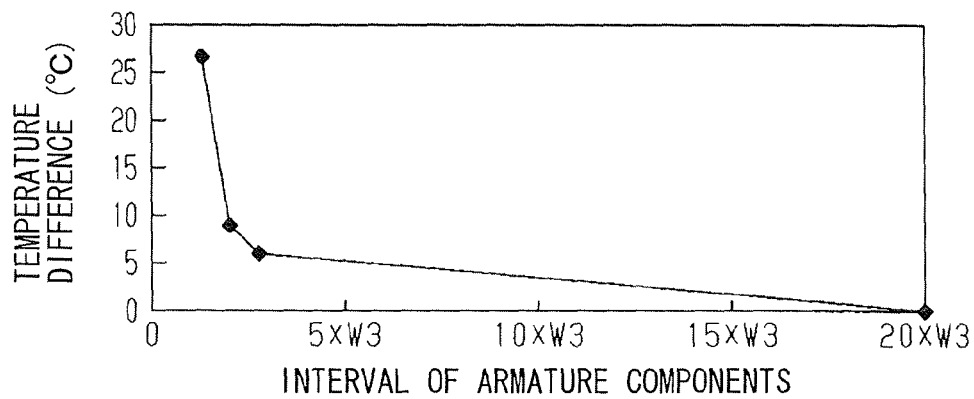
FIG. 8A is a diagram showing a temperature difference between a first one and a center one of armature components, which are continuously conveyed by a screw conveyer and are heated by a high-frequency induction heating device, and an interval between the armature components.
Figure 8B:
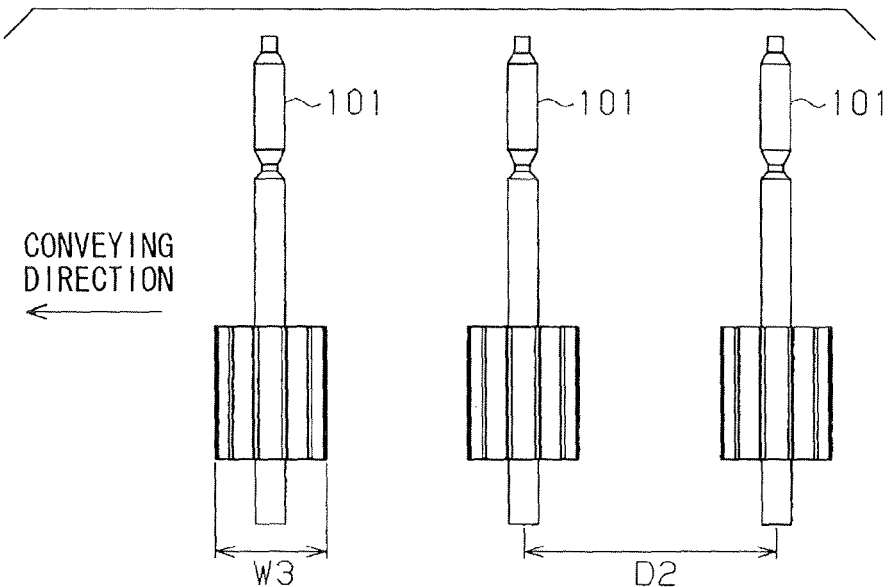
FIG. 8B is a diagram for describing an interval between the armature components.

Furthermore, an adjustment knob 75 is electrically connected to the controller 74. An operator can manipulate the adjustment knob 75 to set an initial distance L between the conveyed armature component 1 and the dummy member 71 and timing of moving the dummy member 71 forward or backward (as well as leftward or rightward and upward or downward as described in detail below). A variable capacitor (not shown) is used for the adjustment knob 75. When the operator manipulates the adjustment knob 75, a capacitance of the variable capacitor changes. In the present embodiment, a relationship between the capacitance of the variable capacitor of the adjustment knob 75 and the weight of the armature component 1 is obtained in advance through experiments in the following manner. First of all, the armature components 1 of different weight groups are prepared. The armature components 1 of each weight group have the same weight. The weight of the armature component 1 in one weight group differs from the weight of the armature component 1 of any other one of the weight groups. Then, the armature components 1 of each weight groups are conveyed at generally equal intervals along the conveying path through the heating and degreasing coil 31 and the heating and curing coil 32. When the temperature of the armature components 1 becomes 240 degrees Celsius at the time of passing the armature components 1 through the heating and degreasing coil 31 or the heating and curing coil 32, the currently set capacitance of the variable capacitor of the adjustment knob 65 is measured and is recorded. This process is repeated for all of the weight groups. In this way, there is known the relationship between the required capacitance of the variable capacitor of the adjustment knob 75, which is required to raise the temperature of the armature component 1 to 240 degrees Celsius, and the corresponding weight of the armature component 1 for each of the weight groups. For instance, as shown in FIG. 7, the adjustment knob 75 is manipulated such that the capacitance of the variable capacitor is increased as the weight of the armature component 1 is increased. In the overheat limiting device 17*a*, 17*b* of the overheat limiting unit 17 of the present embodiment, the initial distance L between the conveyed armature component 1 and the dummy member 71 and the timing of moving the dummy member 71 are set for the armature components 1 having the weigh ranging from 25 g to 350 g.

The controller 74 changes the initial distance L between the conveyed armature component 1 and the dummy member 71 and timing of moving the dummy member 71 forward or backward based on the capacitance of the variable capacitor of the adjustment knob 75. Specifically, the controller 74 sets the initial distance L between the conveyed armature component 1 and the dummy member 71 and timing of moving the dummy member 71 forward or backward based on the weight of the armature component 1 such that the temperature of the armature component 1, which passes through the heating and degreasing coil 31 or the heating and curing coil 32, becomes 240 degrees.

Next, the manufacturing method of the armature component 1 using the electrostatic powder coating apparatus 10 will be described.

With reference to FIG. 6A, the adjustment knob 75 of the overheat limiting unit 17 is manipulated based on the weight of the armature component 1, to which the epoxy resin will be coated. Furthermore, with reference to FIG. 3, the drive motor 23 is driven to rotate the screw shafts 21. The armature components 1 are sequentially supplied to the upstream end part (the right end part in the upper side of FIG. 1) of the screw shafts 21, so that the rotatable shaft 2 of each supplied armature component 1 is received in the guide grooves 21*a* of the screw shafts 21. Each armature component 1 is conveyed along the screw shafts 21 toward a downstream end part (the left end part in the lower side in FIG. 1) of the screw shafts 21 while the armature component 1 is rotated about the central axis of the rotatable shaft 2 thereof. With reference to FIG. 6A, the photosensor 73 of the overheat limiting unit 17 senses whether the armature component 1 is present at the upstream end part of the screw shafts 21 and outputs the sensed result to the controller 74 of the overheat limiting unit 17. The sensing timing of the photosensor 73 is synchronized with the predetermined supply timing of the armature components 1 onto the upstream end part of the screw shafts 21. When the armature components 1 are continuously sequentially supplied to the upstream end part of the screw shafts 21 at predetermined intervals, the photosensor 73 continuously senses the presence of the armature component 1 at the upstream end part of the screw shafts 21. In contrast, when the supplying of the armature components 1 to the upstream end part of the screw shafts 21 is posed, i.e., is stopped to cause absence of the armature component 1 at the upstream end part of the screw shafts 21, the photosensor 73 senses the absence of the armature component 1 at the upstream end part of the screw shafts 21. In the case where the continuous supply of the armature components 1 is posed, i.e., is stopped at the upstream end part of the screw shafts 21, there is left an empty one of mount locations of the screw shafts 21, at which the armature component 1 is supposed to be present, i.e., to be mounted upon the continuous supply of the armature components 1 at the predetermined intervals but is absent due to the posing, i.e., stopping of the continuous supply of the armature components 1. This empty mount location will be hereinafter referred to as an empty designated mount location N.

When the output, which is received from the photosensor 73, indicates the absence of the armature component 1 at the designated mount location on the screw shafts 21, i.e., indicates the presence of the empty designated mount location N at the upstream end part of the screw shafts 21, the controller 74 begins to count the number of rotations of the screw shaft 21. The controller 74 has the previously prepared data, which indicates the moving distance of the empty designated mount location N along the screw shafts 21 from the upstream end part of the screw shafts 21 for each corresponding number of rotations of the screw shaft 21. Therefore, when the number of rotations of the screw shaft 21 is known based on the count value, which indicates the number of rotations of the screw shaft 21, it is possible to determine the moving distance of and the location of the empty designated mount location N from the upstream end part of the screw shafts 21, at which the photosensor 73 is located. Also, when the output, which is received from the photosensor 73, indicates the presence of the armature component 1 at the designated mount location on the screw shafts 21, the controller 74 begins to count the number of rotations of the screw shaft 21. In this way, it is possible to determine the moving distance of and thereby the location of the corresponding armature component 1 at the designated mount location of the screw shafts 21, which is sensed with the photosensor 73 in a manner similar to that of the empty designated mount location N described above.

Thus, the controller 74 can obtain the location of each empty designated mount location N and the location of each armature component 1 on the screw shafts 21. In this instance, the number of rotations of the screw shaft 21 is determined based on the number of rotations of the rotatable shaft 23a of the drive motor 23. The number of rotations of the rotatable shaft 23a of the drive motor 23 is measured with a permanent magnet (not shown), which is rotated integrally with the rotatable shaft 23a, and a Hall IC (not shown), which is provided in the interior of the drive motor 23 at a location adjacent to the Hall IC. The controller 74 can obtain the number of rotations of the rotatable shaft 23a based on the output of the Hall IC. Alternatively, the number of rotations of the screw shaft 21 may be directly measured with a permanent magnet (not shown), which is rotated integrally with the screw shaft 21, and a Hall IC (not shown), which is provided at a location adjacent to this Hall IC. Furthermore, instead of obtaining the moving distance and the location of both of the empty designated mount location N and each armature component 1 along the conveying path, it is possible to obtain the moving distance and the location of only the empty designated mount location N.

With reference to FIG. 1, each of the armature components 1, which are conveyed by the screw shafts 21, is first brought to a heating and degreasing process. In the heating and degreasing process, the armature component 1 is conveyed by the screw shafts 21 of the conveying device 11 and passes through the heating and degreasing coil 31, to which the alternating electric current is supplied from the high-frequency oscillator 30. The high-frequency oscillator 30 also supplies the alternating current to the heating and curing coil 32, which is used in a heating and curing process described below, in a manner similar to that of the heating and degreasing coil 31. When the armature component 1 passes the space between the first upper heating section 31a and the first lower heating section 31b, the armature component 1 is heated by the high-frequency induction heating through the generation of the eddy current in the armature component 1 made of iron and is thereby degreased (i.e., grease or oil component present on the surface of the armature component 1 being vaporized by the heat).

In this heating and degreasing process, as shown in FIGS. 6A and 6B, when the empty designated mount location N of the screw shafts 21, on which the armature component 1 is absent, passes the heating and degreasing coil 31, the controller 74 of the overheat limiting unit 17 drives the corresponding dummy member 71 forward in the direction of arrow S1 to place the dumpy member 71 in the forward position thereof over the empty designated mount location N to cover the same. Specifically, with respect to the lower four of the dummy members 71 shown in FIG. 6B, when the empty designated mount location N of the screw shafts 21 approaches the heating and degreasing coil 31, the controller 74 controls the dummy member drive device 72a to move the first one (right end one in FIG. 6A and FIG. 6B) of the dummy members 71 forward in the direction of arrow S1 toward the forward position, as indicated in FIG. 6A. At the same time, the controller 74 controls the dummy member drive device 72a to drive the cooling circuit 71a of the dummy member 71 placed in the forward position thereof to circulate the cooling fluid through the cooling circuit 71a.

Then, when the empty designated mount location N moves in the conveying direction, the controller 74 controls the dummy member drive device 72a to move the first one of the dummy members 71 in the direction of arrow S2 for a predetermined distance to follow the movement of the empty designated mount location N in the conveying direction. During this period, the first one of the dummy members 71 is raised upward in the vertical direction and is then moved further in the direction of arrow S2, so that the first one of the dummy members 71 is partially overlapped with the second one of the dummy members 71, which has been already moved forward in the direction of arrow S1 to the forward position thereof and is thereby located below the first one of the dummy members 71. Then, the first one of the dummy members 71 is moved backward in the direction of S3 while the second one of the dummy members 71 is moved in the direction of arrow S2 to repeat the movement similar to that of the first one of the dummy members 71 discussed above. Thereafter, the first one of the dummy members 71 is moved in the direction of arrow S4, which is opposite from the conveying direction. During this period, the first one of the dummy members 71 is lowered in the vertical direction and is thereby returned to its initial position. This movement is repeated for the rest of the dummy members 71 until the empty designated mount location N leaves the heating and degreasing coil 31.

The upper four of the dummy members 71 are also driven by the dummy member drive device 72a in a manner similar to that of the lower four of the dummy members 71. Alternatively, at this time, the vertical movements of each upper dummy member 71 may be reversed with respect to those of the lower four of the dummy members 71. Specifically, the upper dummy member 71 may be lowered from its upper position to the lower position in the vertical direction during the movement of the upper dummy member 71 in the direction of arrow S2 and may be raised from the lower position to the upper position in the vertical direction during the movement of the upper dummy member 71 in the direction of arrow S4, if desired. Also, these vertical movements may be applied to the lower dummy members 71 too, if desired. Furthermore, each of the upper and lower dummy members 71 may possibly be moved only forward in the direction of arrow S1 and backward in the direction of arrow S3 without making any other movements in the direction of arrow S2 and the direction of arrow S4 as well as the vertical direction in some suitable cases. Also, if desired, the partial overlap of the adjacent dummy members 71 in the vertical direction discussed above may be eliminated. That is, each dummy member 71 may be moved in the conveying direction, i.e., the direction of arrow S2 without making any vertical movement and may be stopped before contacting the next one of the dummy members 71 prior to the movement of the dummy member 71 in the direction of arrow S3.

In the above described manner, at the heating and degreasing process, even when the armature components 1 are intermittently supplied to the upstream end part of the screw shafts 21 to leave the empty designated mount location N on the screw shafts 21, it is possible to implement the state similar to the fully loaded state of the screw shafts 21 (i.e., each of the designated mount locations is provided with the corresponding armature component 1). In this way, the high-frequency wave, which is generated from the heating and degreasing coil 31, is applied to the upper and lower dummy members 71 and is thereby dispersed. Thus, even when the screw shafts 21 are not fully loaded with the armature components 1, it is possible to limit the concentration of the application of the high-frequency wave to the corresponding adjacent armature component 1, which is placed adjacent to the empty designated mount location N. Furthermore, with use of the corresponding upper and lower dummy members 71, which are placed in the forward position thereof, it is possible to limit the overheating of the adjacent armature component 1, which is located adjacent to the empty designated mount location N, and thereby it is possible to maintain the temperature of the armature components 1 at or around the desired temperature in the heating and degreasing process. Thus, it is possible to maintain each of the conveyed armature components 1, which are conveyed along the screw shafts 21 and are heated by the heating and degreasing coil 31, in generally the same or similar heating state.

Next, as shown in FIG. 1, the armature components 1 are conveyed to a first cooling process. In the first cooling process, the first blower device 13 blows the air toward the conveyed armature components 1 to cool the same.

Thereafter, the armature components 1 are conveyed to a coating process. In the coating process, the armature components 1 are conveyed into the interior of the coating cover 45 of the coating device 14. As shown in FIG. 5, in the coating device 14, the resin powder F is supplied to the powder nozzle 44 from the supply tank 41 through the first conduit 43 by the action of the supply screw 42. Then, the powder nozzle 44 injects, i.e., sprays the resin powder F together with the compressed air toward the armature component 1, which is placed below the powder nozzle 44. At this time, the voltage of the opposite polarity, which is opposite to that of the armature component 1 conveyed in the coating cover 45, is applied to the electrode 44a, so that the resin powder F, which is injected from the powder nozzle 44, is charged positively or negatively. For instance, the positive voltage is applied to the powder nozzle 44, and the armature component 1 is grounded, i.e., is earthed through guide members G, which are provided on the lateral sides, respectively, of the armature component 1. Thereby, the charged resin powder F is electrostatically adhered to the surface of the armature component 1. The guide members G are formed as two elongated rods that are elongated in the conveying direction and are provided on the two lateral sides, respectively, of the armature component 1, which are opposed to each other in the axial direction of the armature component 1. The armature component 1 is conveyed by the screw shafts 21 and is slid along the guide members G to ground the armature component 1. The armature component 1 is rotated about the central axis of the rotatable shaft 2 in response to the rotation of the screw shafts 21. Therefore, when the armature component 1 is conveyed in the interior of the coating cover 45, the applied resin powder F adheres all around the armature component 1 (through the entire 360 degree range about the central axis of the rotatable shaft 2).

The fallen resin powder F, which did not adhere to the armature component 1 and thereby fell in the coating cover 45, is carried to the recovery device 47 through the second conduit 46. The recovered resin powder F, which is recovered into the recovery device 47, is separated into the waste resin powder of the small powder particles and the recyclable resin powder of the large powder particles, each which has the particle size larger than that of the waste resin powder. The waste resin powder is supplied from the recovery device 47 to the powder collector device 49 through the fourth conduit 50 and is then disposed. In contrast, the recyclable resin powder is supplied from the recovery device 47 to the supply tank 41 through the third conduit 48.

Figure 9:
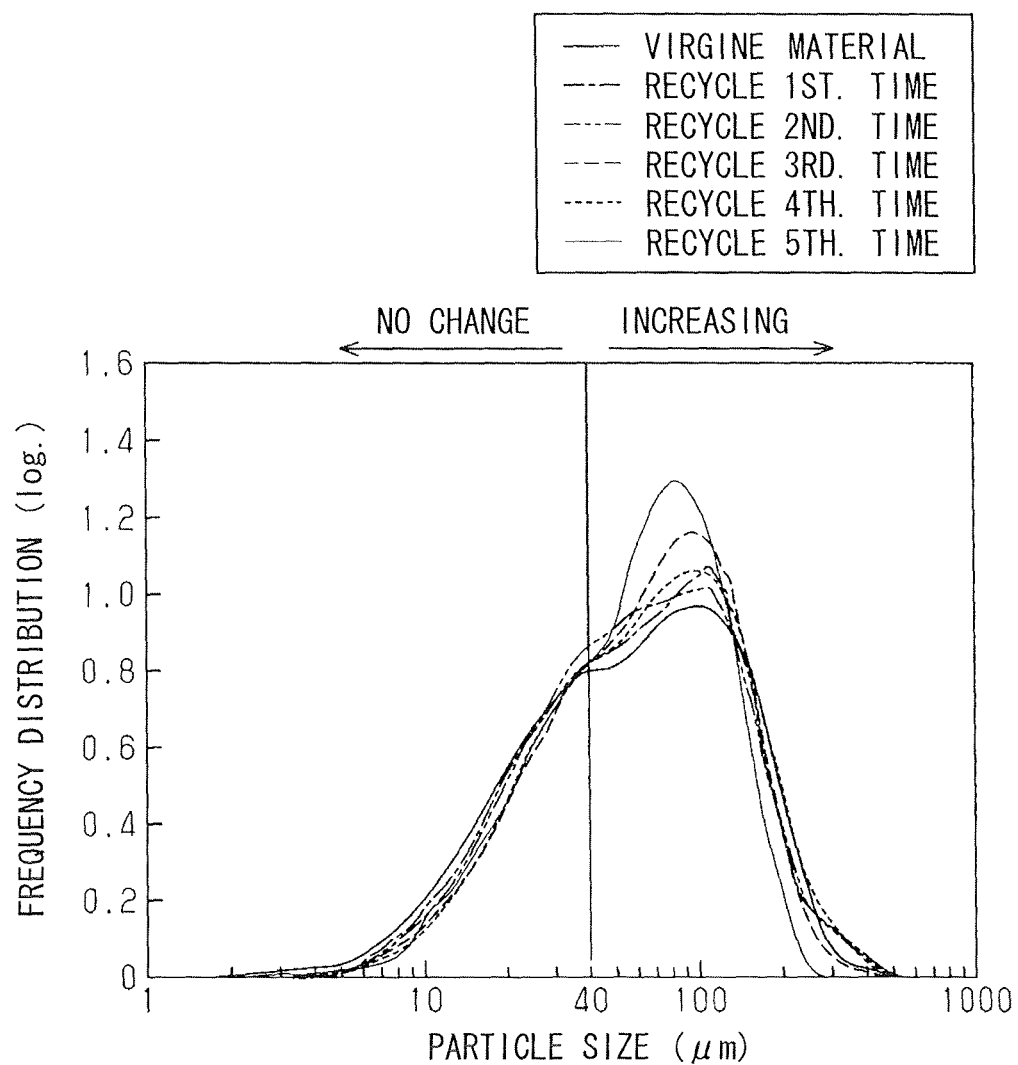
FIG. 9 is a diagram indicating a histogram of a particle size of resin powder in a case where the electrostatic powder coating apparatus of the embodiment is used.
Figure 10:
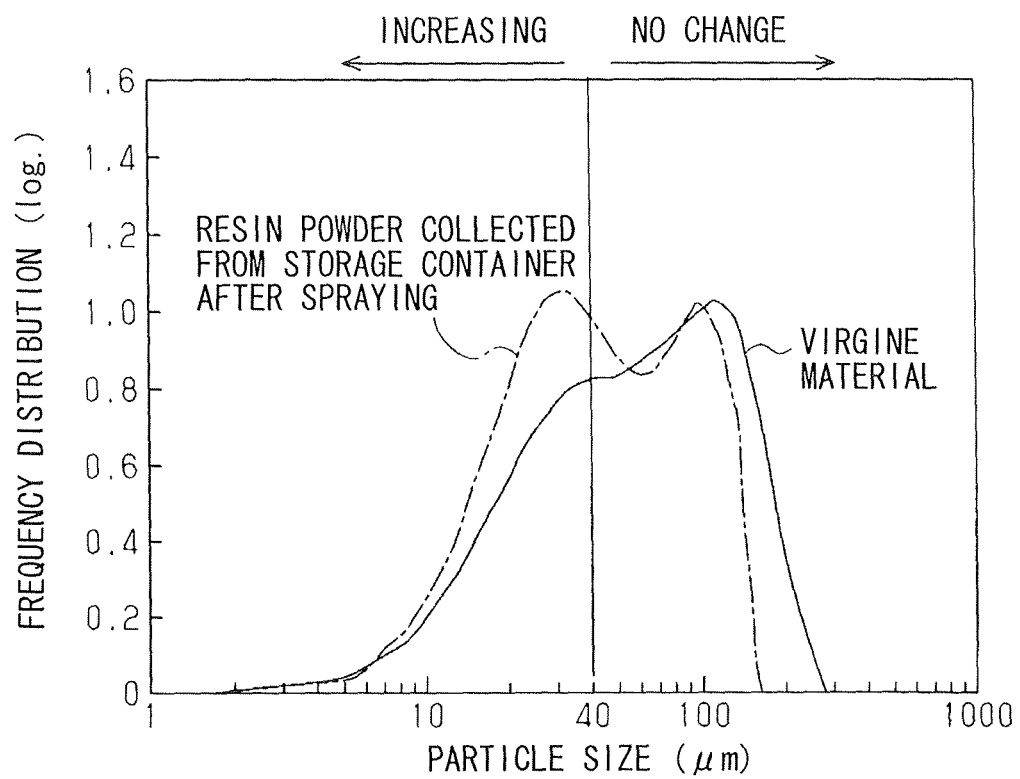
FIG. 10 is a diagram indicating a histogram of a particle size of resin powder in a case where a prior art electrostatic powder coating apparatus is used.

FIG. 9 is a diagram indicating a histogram of particle size of the recovered resin powder F, which is recovered at the recovery device 47 after spraying of the resin powder F over the surface of the armature component 1 at the coating device 14 of the present embodiment. In FIG. 9, the virgin material is the new resin powder F before being used in the coating process. The recycled resin powder F (recycled for the first time to fifth time) is the resin powder F, which is accumulated in the recovery device 47 while driving the coating device 14 for a predetermined time period and is then collected from the recovery device 47. Specifically, first of all, a predetermined quantity of the virgin resin powder F is supplied into the supply tank 41. Then, the coating device 14 is driven until the time, at which the injection quantity of the resin powder F, which is injected from the powder nozzle 44, becomes equal to or smaller than a predetermined value due to depletion of the resin powder F in the supply tank 41. Next, the resin powder F, which is accumulated in the recovery device 47 while driving the coating device 14, is collected as the resin powder F recycled for the first time. Here, it should be noted that the injection quantity of the resin powder F, which is injected from the powder nozzle 44, becomes equal to or smaller than the predetermined value when the coating device 14 is continuously operated for about two hours after the supplying of the predetermined quantity of the virgin resin powder F into the supply tank 41. Thereafter, the predetermined quantity of the resin powder F recycled for the first time is supplied into the supply tank 41. Then, the coating device 14 is driven until the time, at which the injection quantity of the resin powder F, which is injected from the powder nozzle 44, becomes equal to or smaller than the predetermined value. Next, the resin powder F, which is accumulated in the recovery device 47 while driving the coating device 14, is collected as the resin powder F recycled for the second time. This process is repeated in a similar manner up to the fifth time (i.e., until the resin powder F recycled for the fifth time being obtained).

As is understood from FIG. 9, in comparison to the virgin material (the new resin powder F to be supplied into the supply tank 41), the quantity of the small powder particles (i.e., the powder particles having the particle size less than 40 μm), which is contained in the recycled material (the resin powder F, which includes the recycled resin powder separated at the recovery device 47), does not substantially change.

Furthermore, every time the recycle is repeated, the quantity of the large powder particles (i.e., the powder particles having the particle size equal to or larger than 40 μm), which is contained in the resin powder F in the supply tank 41, is increased. As described above, the quantity of the large powder particles, which can easily adhere to the surface of the armature component 1, is increased in the resin powder F received in the supply tank 41. Thereby, the resin powder F, which is injected from the powder nozzle 44, can more easily adhere to the surface of the armature component 1. Furthermore, the small powder particles are not accumulated in the supply tank 41, so that it is possible to limit occurrence of the insufficient film thickness of the dielectric resin film coated on the surface of the armature component 1.

Next, as shown in FIG. 1, the armature components 1 are conveyed to a removing process. In the removing process, the cleaning belt 61 of the removing device 15 is rotated, and this rotating cleaning belt 61 contacts the outer peripheral surface of the armature core 3 (the outer peripheral surface 3*a*1 of the radially outer end part of each of the teeth 3*a*). In this way, the resin powder F, which adheres to the outer peripheral surface of the armature core 3, is removed from the armature core 3.

Next, the armature components 1 are conveyed to a heating and curing process. The armature components 1 are conveyed along the screw shafts 21 of the conveying device 11 through the heating and curing coil 32, to which the alternating electric current is supplied from the high-frequency oscillator 30. The armature components 1 pass through the space between the second upper heating section 32*a* and the second lower heating section 32*b* and are thereby heated by the high-frequency induction heating. Thus, the resin powder F, which adheres to the surface of the armature component 1, is cured, i.e., hardened. Thereby, the dielectric insulation film of the epoxy resin is formed in the predetermined range of surface of the armature component 1.

In this heating and curing process, similar to the heating and degreasing process, when the empty designated mount location N, at which the armature component 1 is absent, passes through the heating and curing coil 32, the controller 74 of the overheat limiting unit 17 controls the dummy member drive device 72*b* to move each corresponding dummy member 71 in a manner similar to that of the heating and degreasing process discussed above. Since this control operation is substantially the same as that of the heating and degreasing process, details of the control operation is not discussed for the sake of simplicity.

Thereby, at the heating and curing process, even when the armature components 1 are intermittently supplied to the upstream end part of the screw shafts 21 to leave the empty designated mount location N on the screw shafts 21, it is possible to implement the state similar to the fully loaded state of the screw shafts 21 (i.e., each of the designated mount locations is provided with the corresponding armature component 1). In this way, the high-frequency wave, which is generated from the heating and curing coil 32, is applied to the upper and lower dummy members 71 and is thereby dispersed. Thus, even when the screw shafts 21 are not fully loaded with the armature components 1, it is possible to limit the concentration of the application of the high-frequency wave to the corresponding adjacent armature component 1, which is placed adjacent to the empty designated mount location N. Furthermore, with use of the upper and lower dummy members 71, which are placed in the forward position thereof, it is possible to limit the overheating of the adjacent armature component 1, which is located adjacent to the empty designated mount location N, and it is possible to maintain the temperature of the armature components 1 at or around the desired temperature in the heating and curing process. Thereby, it is possible to maintain each of the conveyed armature components 1, which are conveyed along the screw shafts 21 and are heated by the heating and curing coil 32, in generally the same or similar heating state.

Next, the armature components 1 are conveyed to a second cooling process. In the second cooling process, the second blower device 16 blows the air toward the conveyed armature components 1 to cool the same. When this second cooling process is completed, the coating of the epoxy resin to the armature component 1 is completed. Then, the corresponding armature component 1 is moved out of the downstream end part of the screw shafts 21 to the outside of the electrostatic powder coating apparatus 10 through an output belt conveyer 82.

The present embodiment discussed above provides the following advantages.

(1) At the time of passing the empty designated mount location N of the screw shafts 21, at which the armature component 1 is absent, through the heating and degreasing coil 31, the overheat limiting unit 17 can limit the overheating of the adjacent armature component 1, which is adjacent to the empty designated mount location N. Therefore, in the heating and degreasing process, in which the armature component 1 is heated and is degreased through the heating and degreasing coil 31, even when the armature components 1 are intermittently supplied to the screw shafts 21 to leave the empty designated mount location N, it is possible to maintain the temperature of the armature component 1 at or around the desired temperature. Therefore, the temperature differences among the armature components 1 in the heating and degreasing process can be reduced or minimized. Furthermore, when the empty designated mount location N passes the heating and curing coil 32, the overheat limiting unit 17 can limit the overheating of the armature component 1, which is located adjacent to the empty designated mount location N. Therefore, in the heating and curing process, in which the armature component 1 is heated to cure the resin powder F through the heating and curing coil 32, even when the armature components 1 are intermittently supplied to the screw shafts 21 to leave the empty designated mount location N, it is possible to maintain the temperature of the armature component 1 at or around the desired temperature. Therefore, the temperature differences among the armature components 1 in the heating and curing process can be reduced or minimized. Since the overheat limiting unit 17 can reduce or minimize the temperature differences among the armature components 1 in the heating and degreasing process and also in heating and curing process, it is possible to reduce the interval between each adjacent armature components 1 in the conveying direction on the screw shafts 21. When the interval between each adjacent armature components 1 in the conveying direction is reduced, it is possible to reduce the size of the screw shafts 21 in the conveying direction and thereby the size of the entire electrostatic powder coating apparatus 10.

(2) The dummy members 71 of each overheat limiting device 17*a*, 17*b* of the overheat limiting unit 17 are moved forward or backward in the direction, which is perpendicular to the conveying direction of the armature components 1, in the plane that is parallel to the plane including the axes of the screw shafts 21. The dummy member 71, which is moved forward in the forward position and is then moved in the conveying direction, can limit the overheating of the armature component 1, which is located adjacent to the empty designated mount location N. Thereby, the overheating of the armature component 1 can be easily limited without interfering the conveying of the armature component 1.

(3) The copper of the dummy member 71 has the high electrical conductivity. Therefore, even when the armature components 1 are intermittently supplied to the screw shafts 21 to leave the empty designated mount location N, it is possible to implement the state similar to the fully loaded state of the screw shafts 21 by placing the dummy member 71 into the forward position and then moving the dummy member 71 in the conveying direction. Therefore, the temperature differences among the armature components 1 can be easily limited. Also, due to the high electrical conductivity of the copper of the dummy member 71, the dummy member 71 is not substantially heated by the high-frequency induction heating unlike the iron material. Therefore, it is possible to avoid an unnecessary temperature increase of the adjacent armature component 1, which is adjacent to the empty designated mount location N.

(4) In the overheat limiting unit 17, when the empty designated mount location N is sensed with the photosensor 73, the controller 74 determines the location of the empty designated mount location N and controls the dummy member drive device 72a, 72b to move the dummy member 71 over the empty designated mount location N. When the movement of the dummy member 71 is controlled based on the location of the empty mount section N, the dummy member 71 can be moved in the effective manner, which is effective to reduce or minimize the temperature differences among the armature components 1.

(5) The dummy member 71 has the cooling circuit 71a. Therefore, at the time of placing the dummy member 71 in the forward position thereof, the temperature increase at the empty mount section N can be limited by the cooling circuit 71a.

(6) The single high-frequency oscillator 30 is used to supply the alternating current to both of the heating and degreasing coil 31 and the heating and curing coil 32. Therefore, in comparison to a case where two high-frequency oscillators are provided to the heating and degreasing coil 31 and the heating and curing coil 32, respectively, it is possible to reduce the size of the electrostatic powder coating apparatus 10. The overheat limiting unit 17 minimizes the temperature differences among the armature components 1. Therefore, even in the case where the single high frequency oscillator 30 is used to supply the alternating current to the heating and degreasing coil 31 and the heating and curing coil 32, it is possible to limit the variations in the quality of the armature components 1.

(7) The powder nozzle 44 downwardly sprays the resin powder F onto the armature component 1, which is located below the powder nozzle 44 in the coating cover 45. The resin powder F, which did not adhere to the armature component 1, is collected at the location below the armature component 1 in the coating cover 45 through the second conduit 46 and is recovered at the recovery device 47. The recovery device 47 separates the recovered resin powder F into the waste resin powder of the small powder particles and the recyclable resin powder of the large powder particles, each of which has the particle size larger than that of the waste resin powder. The waste resin powder is supplied from the recovery device 47 to the powder collector device 49. In contrast, the recyclable resin powder is supplied from the recovery device 47 to the supply tank 41 through the third conduit 48. Therefore, it is possible to limit or minimize the inclusion of the small powder particles into the recyclable resin powder. Thereby, it is possible to limit the accumulation of the small powder particles, which cannot easily adhere to the surface of the armature component 1 and may cause the insufficient film thickness of the dielectric insulation film on the surface of the armature component 1, in the resin powder F in the supply tank 41. Furthermore, the powder nozzle 44 downwardly sprays the resin powder F onto the armature component 1, which is located below the powder nozzle 44 in the coating cover 45. Therefore, the resin powder F can more easily adhere to the surface of the armature component 1 in comparison to the case where the resin powder is upwardly sprayed to the armature component 1 from the lower side of the armature component 1. With this feature, even when the resin powder F is recycled, it is possible to limit variations in the film thickness of the dielectric insulation film, which is formed by spraying the resin powder F onto the surface of the armature component 1.

(8) The resin powder F can be adhered to the armature components 1 of various sizes conveyed into the coating cover 45 by replacing the powder nozzle 44 with the appropriate powder nozzle having the size, which corresponds to the coating area of the subject armature component 1.

(9) The inlet (upstream end) of the second conduit (recovery passage) 46 at the coating cover 45 is opened toward the armature component 1 at the location below the armature component 1 in the coating cover 45, and the outlet (downstream end) of the second conduit 46 is connected to the recovery device 47. Therefore, the resin powder F, which did not adhere to the armature component 1, can be easily recovered at the location below the armature component 1 through the second conduit 46.

(10) The recovery device 47 is the cyclone, so that the recovered resin powder F can be easily separated into the waste resin powder and the recyclable resin powder of the large powder particles, each of which has the particle size larger than that of the waste resin powder.

The above embodiment of the present invention may be modified as follows.

In the above embodiment, the armature component 1 is the component, which forms the armature that serves as the rotor of the dynamo-electric machine. Alternatively, the electrostatic powder coating apparatus 10 of the above embodiment may be used to coat an armature component, which forms a stator of the dynamo-electric machine. Also, the electrostatic powder coating apparatus 10 of the above embodiment may be used to coat resin powder to any other suitable metal component, which is electrically conductive and is other than the armature.

The interval D1 of the armature components 1 on the screw shafts 21 in the fully loaded state, in which the screw shafts 21 are fully loaded with the armature components 1, may be changed to an interval that is generally the same as the width (diameter) of the armature component 1 measured in the conveying direction. With this modification, it is possible to reduce the size of the screw shafts 21 in the conveying direction while maintaining the number of the armature components 1 on the screw shafts 21 in the fully loaded state thereof. Thereby, the entire size of the electrostatic powder coating apparatus 10 can be reduced. The overheat limiting unit 17 limits the overheating of the armature component 1, which is located adjacent to the empty designated mount location N on the screw shafts 21, so that the temperature differences among the armature components 1 can be limited. Thereby, the entire size of the electrostatic powder coating apparatus 10 can be reduced while limiting the temperature differences among the armature components 1.

The material of the dummy member 71 is not limited to the copper and may be changed to any other appropriate metal material, which is electrically conductive. For example, the dummy member 71 may be made of the metal (e.g., iron steel), which is electrically conductive. Even with this modification, when the dummy member 71 is moved forward, the temperature differences among the armature components 1 can be reduced or minimized. Furthermore, the cooling circuit 71a may be eliminated from the dummy member 71, if desired.

In the above embodiment, the dummy member 71 is moved forward or backward in the direction perpendicular to the conveying direction of the armature component 1 in the plane, which is parallel to the plane that includes the central axes of the screw shafts 21. However, the moving direction of the dummy member 71 between the retracted position and the forward position is not limited to this. The dummy member 71 may be moved forward or backward in a direction, which is different from the direction perpendicular to the conveying direction of the armature components 1, in a manner that limits the overheating of the armature components 1 by the heating and degreasing coil 31 or the heating and curing coil 32.

In the above embodiment, the dummy members 71 are provided to both of the heating and degreasing coil 31 and the heating and curing coil 32. Alternatively, the dummy members 71 may be provided to only one of the heating and degreasing coil 31 and the heating and curing coil 32. Even with this modification, it is possible to reduce or minimize the temperature differences among the armature components 1 at the process, which uses the coil 31 or 32 together with the dummy members 71.

In the above embodiment, the single high-frequency oscillator 30 is used to supply the alternating current to both of the heating and degreasing coil 31 and the heating and curing coil 32. Alternatively, two separate high-frequency oscillators may be provided to supply the alternating current to the heating and degreasing coil 31 and the heating and curing coil 32, respectively.

In the above embodiment, the resin powder F, which coats the surface of the armature component 1, is the epoxy resin. However, the resin powder F is not limited to the epoxy resin. That is, any other resin material, which is other than the epoxy resin, may be used as the resin power F as long as the resin power has the dielectric property and the thermosetting property.

In the above embodiment, the recovery device 47 is formed as the cyclone. However, the recovery device 47 is not limited to the cyclone. That is, as long as it is possible to separate the resin powder F, which is recovered from the location below the armature component 1 at the coating cover 45, based on the powder particle size, any other device, which is other than the cyclone, can be used as the recovery device 47.

Additional advantages and modifications will readily occur to those skilled in the art. The invention in its broader terms is therefore not limited to the specific details, representative apparatus, and illustrative examples shown and described.

What is claimed is:

1. An electrostatic powder coating method comprising:
applying resin powder from a coating device to a surface of each of a plurality of workpieces, which are conveyed by a conveying device in a conveying direction along a conveying path, by electrically charging the resin powder with an opposite polarity, which is opposite to a polarity of each of the plurality of workpieces, and electrostatically adhering the resin powder to each of the plurality of workpieces;
heating each corresponding one or more of the plurality of workpieces by high frequency induction heating with at least one heating coil, each of which is placed on a corresponding one of an upstream side and a downstream side of the coating device in the conveying direction along the conveying path, upon supplying of a high-frequency alternating current to the at least one heating coil; and
driving at least one overheat limiting device, each of which is associated with a corresponding one of the at least one heating coil to limit overheating of each corresponding one or more of the plurality of workpieces at time of supplying the high-frequency alternating current to the corresponding one of the at least one heating coil, wherein the driving of the at least one overheat limiting device includes displacing a dummy member, which is made of an electrically conductive material, of the at least one overheat limiting device from a retracted position to a forward position, which is
located between the corresponding one of the at least one heating coil and a corresponding adjacent part of the conveying path of the conveying device, when an empty one of a plurality of mount locations of the conveying device, which are placed one after another in the conveying direction along the conveying path and are adapted to convey the plurality of workpieces, respectively, reaches the forward position of the dummy member.

2. The electrostatic powder coating method according to claim 1, wherein the driving of the at least one overheat limiting device further includes selecting the dummy member from a plurality of dummy members of the at least one overheat limiting device, which are arranged one after another in the conveying direction, based on a location of the empty one of the plurality of mount locations along the conveying path before the displacing of the dummy member of the at least one overheat limiting device.

3. The electrostatic powder coating method according to claim 1, wherein:
the heating of each corresponding one or more of the plurality of workpieces includes heating each corresponding one or more of the plurality of workpieces with a first heating coil and a second heating coil, which are provided as the at least one heating coil and are placed on the upstream side of the coating device and the downstream side of the coating device, respectively, so that each corresponding one or more of the plurality of workpieces is heated and degreased by the first heating coil, and each corresponding one or more of the plurality of workpieces is heated by the second heating coil to cure the resin powder applied to the surface of each corresponding one or more of the plurality of workpieces; and
the driving of the at least one overheat limiting device includes driving a first overheat limiting device and a second overheat limiting device, which are provided as the at least one overheat limiting device and are placed on the upstream side of the coating device and the downstream side of the coating device, respectively, to associate with the first heating coil and the second heating coil, respectively.

4. The electrostatic powder coating method according to claim 3, further comprising supplying the high-frequency alternating current from a single high-frequency oscillator to both of the first heating coil and the second heating coil.

5. The electrostatic powder coating method according to claim 1, wherein the displacing of the dummy member includes displacing the dummy member from the retracted position to the forward position in a direction, which is generally perpendicular to the conveying direction.

6. The electrostatic powder coating method according to claim 5, wherein the displacing of the dummy member further includes displacing the dummy member in the conveying direction to follow movement of the empty one of the plurality of mount locations of the conveying device in the conveying direction after the displacing of the dummy member from the retracted position to the forward position.

7. The electrostatic powder coating method according to claim 1, further comprising cooling the dummy member of the at least one overheat limiting device by circulating cooling fluid through a cooling circuit of the dummy member at the time of supplying the high-frequency alternating current to the corresponding one of the at least one heating coil.

8. The electrostatic powder coating method according to claim 1, wherein the electrically conductive material of the dummy member of the at least one overheat limiting device is an electrically conductive metal material.

9. The electrostatic powder coating method according to claim 8, wherein the electrically conductive metal material of the dummy member of the at least one overheat limiting device is one of copper and a copper alloy.

10. The electrostatic powder coating method according to claim 1, wherein the plurality of workpieces is a plurality of armature components, each of which is a component of an armature of a dynamo-electric machine.

11. An electrostatic powder coating method comprising:
downwardly spraying electrostatically charged resin powder, which is supplied from a storage container, through a spray device and electrostatically adhering the resin powder to each corresponding one of a plurality of workpieces, which are conveyed by a conveying device in a conveying direction along a conveying path, from a location above the workpiece;
heating each corresponding one or more of the plurality of workpieces by high-frequency induction heating with at least one heating coil, each of which is placed on a corresponding one of an upstream side and a downstream side of the spray device in the conveying direction along the conveying path, upon supplying of a high-frequency alternating current to the at least one heating coil; and
driving at least one overheat limiting device, each of which is associated with a corresponding one of the at least one heating coil to limit overheating of each corresponding one or more of the plurality of workpieces at time of supplying the high-frequency alternating current to the corresponding one of the at least one heating coil, wherein the driving of the at least one overheat limiting device includes displacing a dummy member, which is made of an electrically conductive material, of the at least one overheat limiting device from a retracted position to a forward position, which is located between the corresponding one of the at least one heating coil and a corresponding adjacent part of the conveying path of the conveying device, when an empty one of a plurality of mount locations of the conveying device, which are placed one after another in the conveying direction along the conveying path and are adapted to convey the plurality of workpieces, respectively, reaches the forward position of the dummy member;
recovering remaining resin powder, which falls down without adhering to the workpiece upon the downwardly spraying of the resin powder from the spray device, through a recovery device, wherein the recovering of the remaining resin powder includes recovering the remaining resin powder from a location below the workpiece and separating the recovered remaining resin powder into recyclable resin powder to be recycled and waste resin powder to be wasted;
collecting the waste resin powder from the recovery device and disposing the waste resin powder through a disposal device; and
conducting the recyclable resin powder from the recovery device to the storage container through a recycle conduit.

12. The electrostatic powder coating method according to claim 11, wherein the plurality of workpieces is a plurality of armature components, each of which is a component of an armature of a dynamo-electric machine.

* * * * *